United States Patent
Mizutani

(10) Patent No.: US 12,021,359 B2
(45) Date of Patent: Jun. 25, 2024

(54) ELECTRIC WIRE PROTECTION MEMBER AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Yoshio Mizutani, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 155 days.

(21) Appl. No.: 17/911,565

(22) PCT Filed: Feb. 26, 2021

(86) PCT No.: PCT/JP2021/007319
§ 371 (c)(1),
(2) Date: Sep. 14, 2022

(87) PCT Pub. No.: WO2021/187054
PCT Pub. Date: Sep. 23, 2021

(65) Prior Publication Data
US 2023/0106031 A1    Apr. 6, 2023

(30) Foreign Application Priority Data
Mar. 17, 2020 (JP) .................... 2020-046575

(51) Int. Cl.
*H02G 3/04*  (2006.01)
*H01F 7/02*  (2006.01)

(52) U.S. Cl.
CPC ............ *H02G 3/0406* (2013.01); *H01F 7/02* (2013.01); *H02G 3/0481* (2013.01)

(58) Field of Classification Search
CPC .................. H02G 3/0406; B60R 16/0207
See application file for complete search history.

(56) References Cited

U.S. PATENT DOCUMENTS

2013/0269981 A1   10/2013  Shiga et al.
2015/0289420 A1*  10/2015  Imahori ............... H05K 9/0098
                                                        174/350

(Continued)

FOREIGN PATENT DOCUMENTS

JP    H09-8489 A      1/1997
JP    2003-92486 A    3/2003

(Continued)

OTHER PUBLICATIONS

Apr. 6, 2021 Search Report issued in International Patent Application No. PCT/JP2021/007319.

*Primary Examiner* — Hung V Ngo
(74) *Attorney, Agent, or Firm* — Oliff PLC

(57) ABSTRACT

An electric wire protection member to be provided at an end in a longitudinal direction of a tube that covers an outer circumference of an electric wire, the electric wire protection member including: a case; and a magnetic core provided to surround the outer circumference of the electric wire, wherein: the case includes: a core housing that houses the magnetic core; and a cover that covers an inner circumferential edge at the end of the tube, the core housing and the cover are formed in one piece with the case.

8 Claims, 7 Drawing Sheets

(56) References Cited

U.S. PATENT DOCUMENTS

| | | | |
|---|---|---|---|
| 2017/0174152 A1* | 6/2017 | Yamaguchi | H01B 7/426 |
| 2018/0233263 A1* | 8/2018 | Mizutani | H01F 17/06 |
| 2018/0247758 A1* | 8/2018 | Oka | H01R 13/6598 |
| 2021/0122308 A1* | 4/2021 | Fujikura | B60R 16/0222 |
| 2021/0134482 A1* | 5/2021 | Tanaka | H01F 17/06 |
| 2023/0076202 A1* | 3/2023 | Hayashi | H02G 3/0406 |
| 2023/0088375 A1* | 3/2023 | Hayashi | H01B 7/18 174/72 A |
| 2023/0091092 A1* | 3/2023 | Yokota | H01B 7/00 174/72 A |
| 2023/0092669 A1* | 3/2023 | Izawa | H02G 3/0406 174/72 A |
| 2023/0247815 A1* | 8/2023 | Izawa | H02G 3/30 174/350 |

FOREIGN PATENT DOCUMENTS

| | | |
|---|---|---|
| JP | 2012-205482 A | 10/2012 |
| JP | 2017-54722 A | 3/2017 |
| JP | 2018-63819 A | 4/2018 |

\* cited by examiner

ELECTRIC WIRE PROTECTION MEMBER AND WIRE HARNESS

BACKGROUND

The present disclosure relates to an electric wire protection member and a wire harness.

For example, JP 2012-205482A discloses an electric wire protection member to be provided at an end portion in a longitudinal direction of a tubular exterior member that covers the exterior surface of an electric wire. This electric wire protection member includes a covering portion for covering the inner circumferential edge portion at the end portion. Accordingly, the covering portion suppresses contact of the electric wire with the edge portion at a time when the lead-out section of the electric wire drawn out of the end portion of the exterior member is handled, or a vehicle vibrates after attachment of the electric wire and the like to the vehicle. As a result, damage to the electric wire caused by the contact with the inner circumferential edge portion is suppressed.

Moreover, for example, JP 2003-92486A discloses an electromagnetic wave absorption member for absorbing an electromagnetic wave (electromagnetic noise) emitted from an electric wire. The electromagnetic wave absorption member includes a case configured to be fixed to the electric wire and surround the outer circumference of the electric wire, and a magnetic core ("sleeve core" in JP 2003-92486A) housed in the case. The magnetic core is constituted by, for example, a ferrite core or the like, and can absorb an electromagnetic wave emitted from the electric wire.

SUMMARY

With a configuration in which the electromagnetic wave absorption member as mentioned above is attached to the lead-out section of the electric wire drawn out of the end portion of the exterior member, the lead-out section of the electric wire is likely to come into contact with the above-mentioned inner circumferential edge portion due to the weight of the electromagnetic wave absorption member. Accordingly, it is preferable to also apply the electric wire protection member as disclosed in JP 2012-205482A above to such a configuration. However, in this case, there is a problem in that the number of components increases due to the electric wire protection member that includes the case and the magnetic core as well as the electric wire protection member being provided.

An exemplary aspect of the disclosure provides an electric wire protection member capable of absorbing an electromagnetic wave emitted from an electric wire as well as suppressing an increase in the number of components, and a wire harness.

An electric wire protection member of the present disclosure is an electric wire protection member to be provided at an end in a longitudinal direction of a tube that covers an outer circumference of an electric wire, the electric wire protection member including: a case; and a magnetic core provided to surround the outer circumference of the electric wire, wherein: the case includes: a core housing that houses the magnetic core; and a cover that covers an inner circumferential edge at the end of the tube, the core housing and the cover are formed in one piece with the case.

A wire harness of the present disclosure is a wire harness including: an electric wire; a tube that covers an outer circumference of the electric wire; and an electric wire protection member provided at an end in a longitudinal direction of the tube, wherein: the electric wire protection member includes: a case; and a magnetic core provided to surround the outer circumference of the electric wire, and the case includes: a core housing that houses the magnetic core; and a cover that covers an inner circumferential edge portion at the end of the tube, the core housing and the cover are formed in one piece with the case.

With the present disclosure, it is possible to provide an electric wire protection member capable of absorbing an electromagnetic wave emitted from an electric wire as well as suppressing an increase in the number of components, and a wire harness.

DETAILED DESCRIPTION OF EMBODIMENTS

Figure 1:
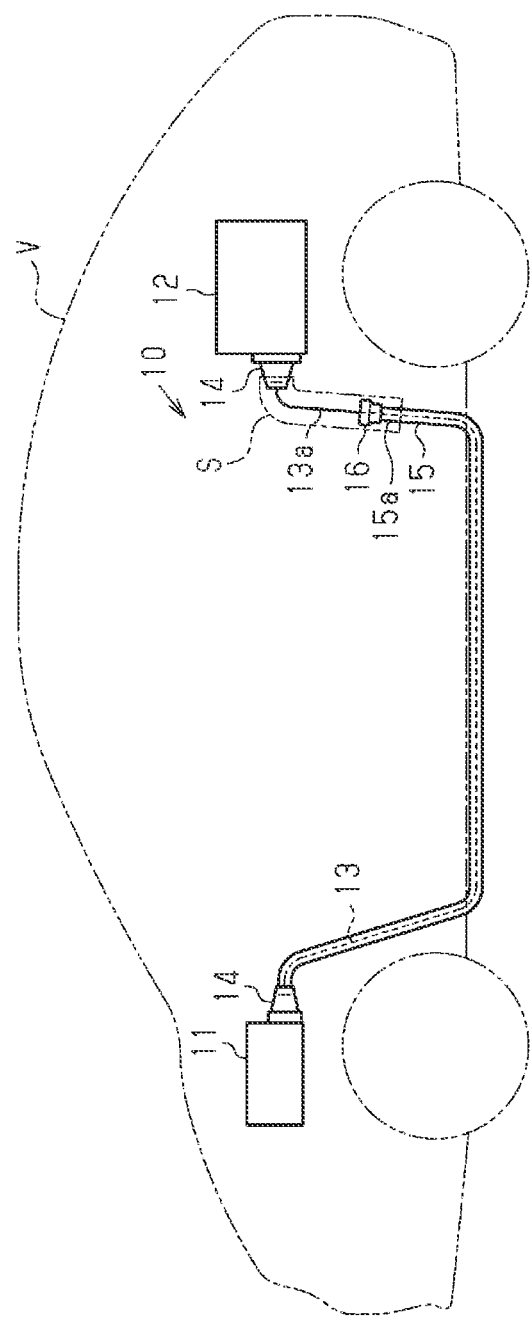
FIG. 1 is a schematic configuration diagram showing a wire harness according to an embodiment.

Description of Embodiments of the Present Disclosure

First, embodiments of the present disclosure will be listed and described.

An electric wire protection member of the present disclosure is

[1] an electric wire protection member to be provided at an end portion in a longitudinal direction of a tubular exterior member that covers an outer circumference of an electric wire, the electric wire protection member including: a case; and a magnetic core provided to surround the outer circumference of the electric wire, wherein the case includes: a core housing portion that houses the magnetic core; and a covering portion that covers an inner circumferential edge portion at the end portion, the core housing portion and the covering portion being formed in one piece with the case.

With this configuration, the covering portion for preventing the electric wire from coming into contact with the end portion of the exterior member and the core housing portion that houses the magnetic core are formed in one piece with the case of the electric wire protection member. Accordingly, there is no need to provide a core case for housing the magnetic core separately from the electric wire protection member having the covering portion. Therefore, although the magnetic core for absorbing an electromagnetic wave emitted from the electric wire is provided, it is possible to suppress an increase in the number of components.

[2] The case includes a locking portion to be locked to a locking-target portion of the exterior member, one of the locking portion and the locking-target portion is a protrusion, and the other of the locking portion and the locking-target portion is a recessed portion to which the protrusion is to be fitted. With this configuration, it is possible to couple the case to the exterior member through locking by recess-projection fitting between the locking portion of the case and the locking-target portion of the exterior member.

[3] The case includes an insertion portion to be inserted into an inner circumferential side or outer circumferential side of the exterior member, and the insertion portion and the core housing portion are provided at positions that do not overlap each other in a radial direction. With this configuration, the core housing portion and the magnetic core can be configured to be arranged outside the exterior member.

[4] The magnetic core is provided with a core-side through hole through which the electric wire is to be inserted, a diameter of the core-side through hole is smaller than an inner diameter of the end portion, and the magnetic core includes a core-side chamfered portion formed by chamfering a corner portion that defines an opening of the core-side through hole into a curved surface. With this configuration, it is possible to suppress damage to the electric wire caused by contact of the electric wire with the corner portion (core-side chamfered portion) that defines the opening of the core-side through hole.

[5] The case is provided with a case-side through hole through which the electric wire is to be inserted, a diameter of the case-side through hole is smaller than an inner diameter of the end portion, and the case includes a case-side chamfered portion formed by chamfering a corner portion that defines an opening of the case-side through hole into a curved surface. With this configuration, it is possible to suppress damage to the electric wire caused by contact of the electric wire with the corner portion (case-side chamfered portion) that defines the opening of the case-side through hole.

[6] The covering portion is a fitting portion that includes: an inner wall portion configured to come into contact with an inner circumferential surface that includes the end portion of the exterior member; an outer wall portion configured to come into contact with an outer circumferential surface that includes the end portion of the exterior member; and a bottom wall portion that connects the inner wall portion and the outer wall portion, and the end portion of the exterior member is to be fitted between the outer wall portion and the inner wall portion of the fitting portion. With this configuration, the end portion of the exterior member is fitted into the fitting portion of the case, thus making it possible to couple the electric wire protection member firmly to the end portion of the exterior member.

[7] A wire harness of the present disclosure is a wire harness including: an electric wire; a tubular exterior member that covers an outer circumference of the electric wire; and an electric wire protection member provided at an end portion in a longitudinal direction of the exterior member, wherein the electric wire protection member includes: a case; and a magnetic core provided to surround the outer circumference of the electric wire, and the case includes: a core housing portion that houses the magnetic core; and a covering portion that covers an inner circumferential edge portion at the end portion; the core housing portion and the covering portion being formed in one piece with the case.

With this configuration, the covering portion for preventing the electric wire from coming into contact with the end portion of the exterior member and the core housing portion that houses the magnetic core are formed in one piece with the case of the electric wire protection member. Accordingly, there is no need to provide a core case for housing the magnetic core separately from the electric wire protection member having the covering portion. Therefore, although the magnetic core for absorbing an electromagnetic wave emitted from the electric wire is provided, it is possible to suppress an increase in the number of components.

[8] The wire harness includes a connector provided at an end portion in a longitudinal direction of the electric wire, wherein the electric wire protection member and the connector are spaced apart from each other in the longitudinal direction of the electric wire. Employing this configuration makes it possible to achieve a configuration in which the case of the electric wire protection member includes the covering portion and the core housing portion that are formed in one piece with the case while the connector at the end portion of the electric wire is spaced apart from the exterior member.

Details of Embodiments of the Present Disclosure

The following describes specific embodiments of an electric wire protection member and a wire harness of the present disclosure with reference to the drawings. Portions of the configuration may be exaggerated or simplified in the diagrams for convenience in the description. In addition, the ratios between the dimensions shown in the diagrams may be different from each other. The term "parallel" as used herein encompasses not only "precisely parallel" but also "substantially parallel" as long as the functions and effects of these embodiments are exhibited. Note that the present disclosure is not limited to these embodiments and is defined by the scope of the appended claims, and all changes that fall within the same essential spirit as the scope of the claims are intended to be included therein.

Overall Configuration of Wire Harness 10

A wire harness 10 shown in FIG. 1 electrically connects two or three or more electric apparatuses installed in a vehicle V such as a hybrid car or an electric car. For example, the wire harness 10 electrically connects an inverter 11 and a high-voltage battery 12 that are provided in the vehicle V. Note that the wire harness 10 is routed such that the intermediate portion in the longitudinal direction of the wire harness 10 passes outside the vehicle compartment (e.g, under the floor) of the vehicle V, for example.

The inverter 11 is connected to a wheel drive motor (not illustrated) that is a power source for the traveling of the vehicle. The inverter 11 generates AC power from DC power provided by the high-voltage battery 12, and supplies the AC power to the motor. The high-voltage battery 12 can supply a voltage of several hundred volts, for example.

The wire harness 10 includes, for example, one or more (three in this embodiment) electric wires 13, a pair of connectors 14 that are respectively attached to the two end portions of each electric wire 13, an exterior member 15 (tube) that collectively surrounds a plurality of electric wires 13, and an electric wire protection member 16 provided at an end portion 15a in the longitudinal direction of the exterior member 15.

Configuration of Electric Wire 13

One end portion of each electric wire 13 is connected to the inverter 11 via the connector 14, and the other end portion of each electric wire 13 is connected to the high-voltage battery 12 via the connector 14. The electric wires 13 are formed in an elongated shape and extend in the front-rear direction of the vehicle V, for example. The electric wires 13 are, for example, high-voltage electric wires to which a high voltage/a large current can be applied. The electric wires 13 may be, for example, shielded electric wires having an electromagnetic shield structure, or a non-shielded electric wire having no electromagnetic shield structure. Alternatively, a configuration may also be employed in which a separate shield member covers the outer circumference of a non-shielded electric wire. The electric wires 13 of this embodiment are non-shielded electric wires.

The electric wires 13 are coated electric wires obtained by coating a core wire constituted by a conductor with an insulation coating. The insulation coating of the electric wire 13 is made of, for example, an insulating material such as a synthetic resin.

Examples of the core wire of the electric wire 13 include a stranded wire obtained by twisting a plurality of metal strands, a columnar conductor constituted by a single columnar metal rod having a solid structure, and a tubular conductor having a hollow structure. Also, a combination of a stranded wire, a columnar conductor, and a tubular conductor may be used as the core wire of the electric wire 13. Examples of the columnar conductor include a single-core wire and a bus bar. The core wire of the electric wire 13 of this embodiment is constituted by a stranded wire. A metal material such as a copper-based metal material or an aluminum-based metal material can be used as a material of the core wire of the electric wire 13, for example. Note that the cross section of the core wire of the electric wire 13 taken along a plane orthogonal to the longitudinal direction of the core wire of the electric wire 13 (i.e., the lateral cross section) may have any shape, and examples of the shape include a circular shape, a semicircular shape, a polygonal shape, a square shape, and a flat shape.

Configuration of Exterior Member 15

Figure 2:
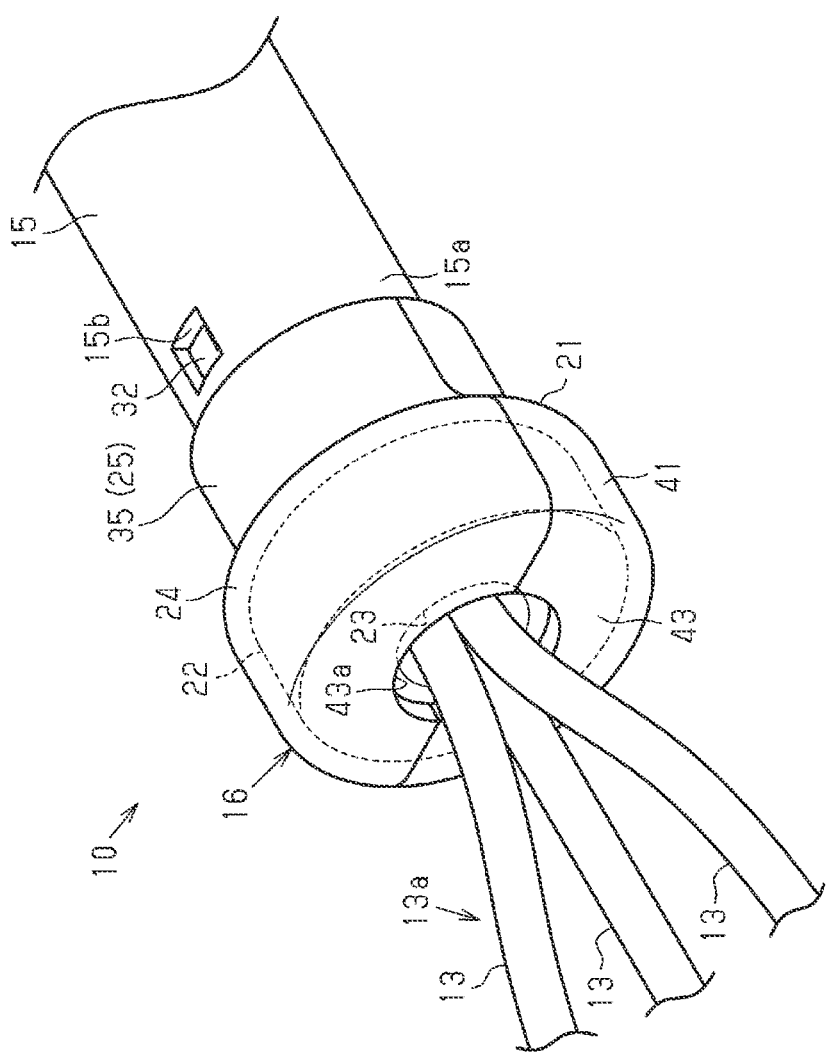
FIG. 2 is a perspective view showing a relevant portion of the wire harness shown in FIG. 1.
Figure 3:
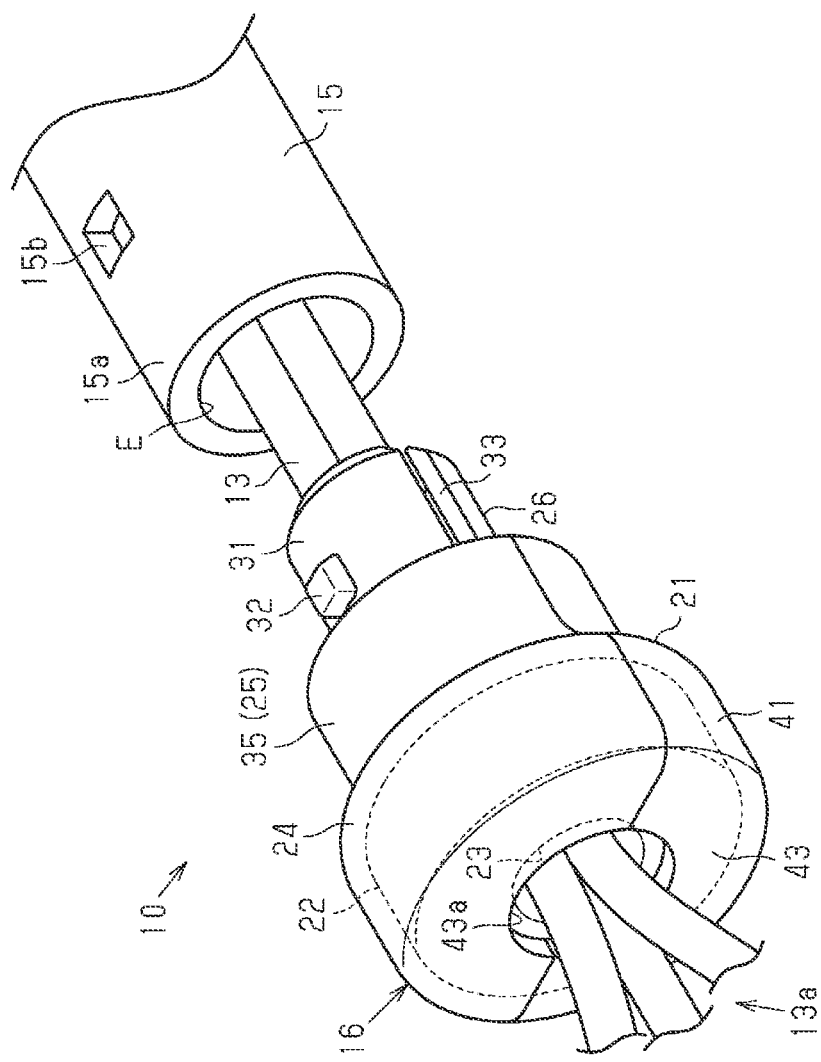
FIG. 3 is an exploded perspective view showing the relevant portion of the wire harness shown in FIG. 1.

As shown in FIGS. 2 and 3, the exterior member 15 has an elongated tubular shape as a whole. The plurality of electric wires 13 are inserted through the inner space of the exterior member 15. The exterior member 15 is formed so as to be capable of surrounding the entire outer circumference of the bundle of the plurality of electric wires 13, for example. The exterior member 15 protects the electric wires 13 from, for example, flying objects and waterdrops. The exterior member 15 is provided so as to surround portions in the longitudinal direction of the electric wires 13.

The "tubular shape" as used herein need only be a shape that can be considered as a tubular shape as a whole, and encompasses a tubular shape constituted by a combination of a plurality of components, and a shape provided with a cutout portion such as a C-shape. The exterior member 15 of this embodiment is constituted by a single component.

The exterior member 15 of this embodiment is constituted by, for example, a metal pipe or a resin pipe. A metal material such as a copper-based metal material or an aluminum-based metal material can be used as a material of the metal pipe. A synthetic resin such as polyolefin, polyamide, polyester, or ABS resin can be used as a material of the resin pipe.

As shown in FIGS. 1 and 2, the electric wire 13 includes a lead-out portion 13a that is led out to the outside of the exterior member 15 from the end portion 15a (the end portion on the right side in FIG. 1) in the longitudinal direction of the exterior member 15. The lead-out portion 13a is led out from the end portion 15a of the exterior member 15 and has a predetermined length. That is, the end portion 15a of the exterior member 15 and the connector 14 provided at the leading end portion of the lead-out portion 13a are spaced apart from each other at a predetermined interval in the longitudinal direction of the electric wire 13.

Overall Configuration of Electric Wire Protection Member 16

Figure 4:
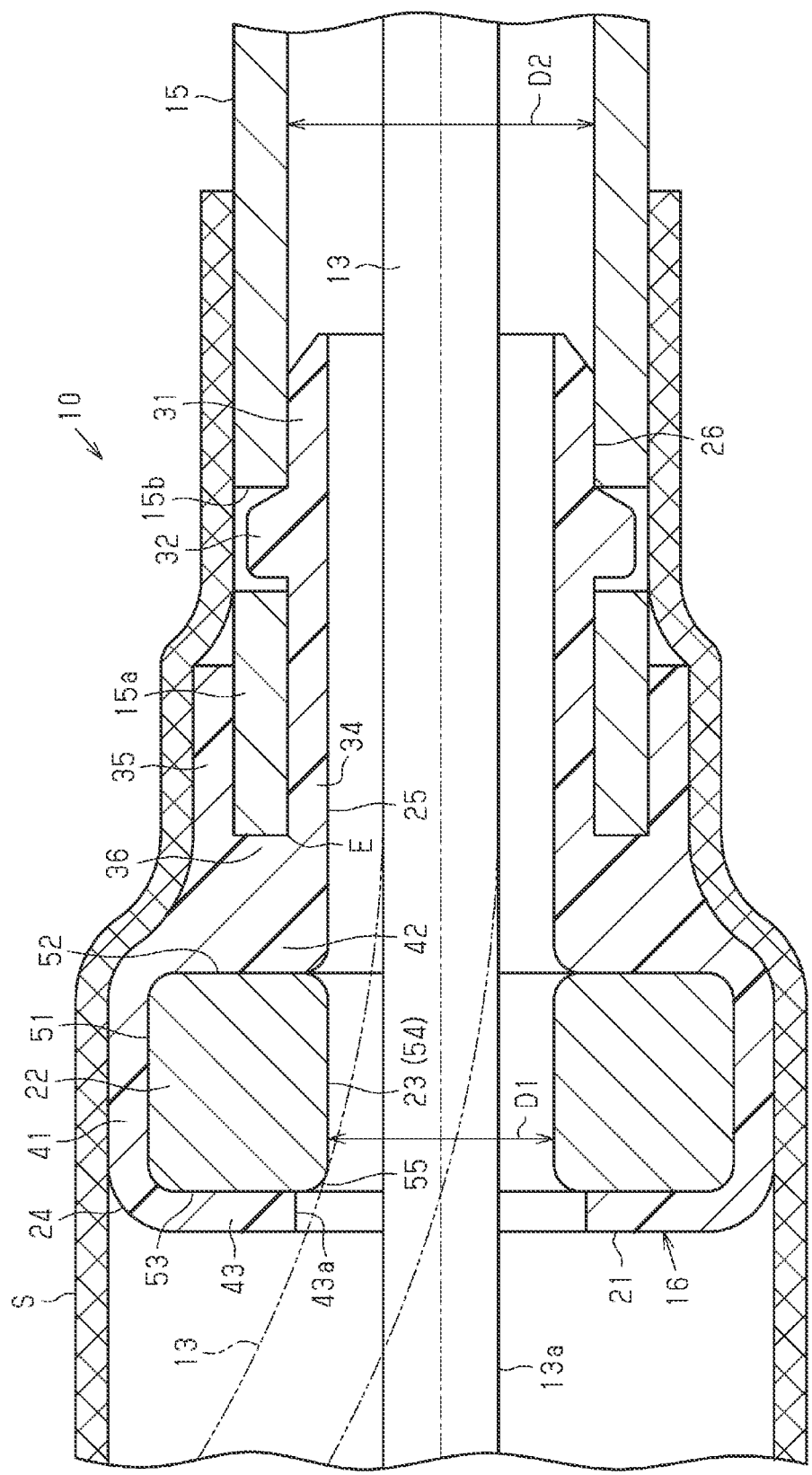
FIG. 4 is a cross-sectional view showing the relevant portion of the wire harness shown in FIG. 1.

As shown in FIGS. 2, 3, and 4, the electric wire protection member 16 is provided at the end portion 15a of the exterior member 15. The electric wire protection member 16 of this embodiment has a tubular shape as a whole, and is capable of surrounding the outer circumference of the bundle of the plurality of electric wires 13. In the overall view of the wire harness 10, the electric wire protection member 16 is provided at the intermediate position in the longitudinal direction of the electric wires 13. Moreover, the electric wire protection member 16 is spaced apart from the connector 14 provided at the leading end portion of the lead-out portion 13a, in the longitudinal direction of the electric wires 13. The electric wire protection member 16 includes a case 21 having a ring shape extending in the circumferential direction of the exterior member 15, and a magnetic core 22 housed in the case 21.

Configuration of Magnetic Core 22

The magnetic core 22 is provided with a through hole 23 through which the plurality of electric wires 13 are inserted, for example. That is, the through hole 23 passes through the magnetic core 22 in the longitudinal direction of the electric wires 13. The magnetic core 22 is provided with the through hole 23 and thus has a ring shape. The magnetic core 22 of this embodiment is formed in a circular ring shape.

The "ring" as used herein is a ring whose outer edge has any closed shape constituted by straight lines or curved lines, and encompasses a circular ring whose outer edge has a circular shape, a ring whose outer edge has an elliptic shape or an oblong shape, a polygonal ring whose outer edge has a polygonal shape, and a ring whose outer edge has a rounded polygonal ring. The "ring" has a shape provided with a through hole in a plan view, and encompasses a ring in which its outer edge and the inner circumference of the through hole have the same shape, and a ring in which its outer edge and the inner circumference of the through hole have different shapes. The "ring" encompasses those having predetermined lengths in a direction in which a through hole passes therethrough, and there is no limitation on the lengths. The "ring shape" as used herein need only be a shape that can be considered as a ring shape as a whole, and encompasses a shape provided with a cutout portion such as a C-shape. The magnetic core 22 is formed in a ring shape that is provided with the through hole 23, for example, in a plan view as viewed in the longitudinal direction of the electric wires 13, and that has a predetermined length in a direction in which the through hole 23 passed therethrough.

As shown in FIGS. 2 and 3, the magnetic core 22 of this embodiment is continuous around the entire circumference, and has a closed-ring shape. That is, the magnetic core 22 of this embodiment is not provided with a slit extending in the longitudinal direction of the electric wires 13. The magnetic core 22 of this embodiment is constituted by a single component. Although the magnetic core 22 of this embodiment is constituted by a single component, the magnetic core 22 may also be formed in a ring shape using a plurality of core materials in combination. For example, the magnetic core 22 is formed in a circular ring shape using a pair of core materials whose lateral cross sections have a semicircular shape. With this configuration, the electric wire protection member 16 that includes the magnetic core 22 can be attached to the electric wires 13 that have been attached to the vehicle V in advance.

The magnetic core 22 can reduce an electromagnetic wave (electromagnetic noise) emitted from the electric wires 13 by being arranged, for example, so as to cover the entire circumference of the bundle of the electric wires 13 and face the electric wires 13. For example, the magnetic core 22 absorbs an electromagnetic wave emitted from the electric wires 13 and converts the energy of the electromagnetic wave into heat energy. Thus, an adverse effect of an electromagnetic wave emitted from the electric wires 13 on the surrounding apparatuses and the like is reduced.

The term "facing" as used herein means that surfaces or members are positioned so as to be opposed to each other, and encompasses a case where surfaces or members are positioned such that their entireties are opposed to each other as well as a case where surfaces or members are positioned such that their portions are opposed to each other. Also, the term "facing" as used herein encompasses both a case where a member separate from the two portions is provided between the two portions and a case where nothing is provided between the two portions.

The magnetic core 22 is, for example, a molded article containing a soft magnetic material. Examples of the soft magnetic material include iron (Fe), iron alloys, and ferrite. Examples of the iron alloys include an Fe-silicon (Si) alloy and an Fe-nickel (Ni) alloy. A ferrite core, an amorphous core, or a permalloy core can be used as the magnetic core 22, for example. The ferrite core is made of, for example, soft ferrite having soft magnetism. Examples of the soft ferrite include ferrite containing nickel (Ni) and zinc (Zn), and ferrite containing manganese (Mn) and zinc (Zn). A material of the magnetic core 22 can be selected as appropriate depending on, for example, the frequency band of electromagnetic noise to be reduced.

Configuration of Case 21

The case 21 is, for example, an injection-molded article made of a synthetic resin. A synthetic resin such as polyolefin, polyamide, polyester, or ABS resin can be used as a material for forming the case 21.

As shown in FIGS. 3 and 4, the case 21 has a tubular shape as a whole. The axial direction of the case 21 (tubular-shape penetration direction) extends in parallel with the longitudinal direction of the exterior member 15. Note that the axial direction of the case 21 may be referred to merely as an "axial direction" in the following description. The case 21 of this embodiment is constituted by two divided semicircular components, and the two components are assembled into a cylindrical shape.

The case 21 includes a core housing portion 24 (core housing) that houses the magnetic core 22, a fitting portion 25 serving as a covering portion (cover) for covering an inner circumferential edge portion E at the end portion 15a of the exterior member 15, and a coupling portion 26 coupled to the end portion 15a of the exterior member 15, and these portions are formed in one piece with the case 21.

Configuration of Coupling Portion 26

The coupling portion 26 includes, for example, a tubular insertion portion 31 (insertion) inserted into the inner circumferential side of the end portion 15a of the exterior member 15, and a locking portion 32 (lock) protruding outward in the redial direction from the outer circumferential surface of the insertion portion 31. The insertion portion 31 is provided with, for example, two slits 33 extending in the axial direction of the insertion portion 31. The two slits 33 are located at positions spaced apart from each other by 180 degrees in the circumferential direction, and face each other.

For example, two locking portions 32 are provided. The two locking portions 32 are respectively provided on two portions of the insertion portion 31 that are divided by the two slits 33. Also, for example, the two locking portions 32 are located at positions spaced apart from each other by 180 degrees in the circumferential direction, and face each other.

The axial direction of the insertion portion 31 extends in the longitudinal direction of the exterior member 15. The insertion portion 31 is inserted into the end portion 15a of the exterior member 15 in the longitudinal direction of the exterior member 15 with the leading end portion in the axial direction of the insertion portion 31 being inserted first.

Two locking-target portions 15b (locking-targets) are formed on a region that includes the end portion 15a of the exterior member 15. The two locking-target portions 15b are, for examples, holes (recessed portions/recess) passing through the exterior member 15 in the radial direction. For example, the two locking-target portions 15b are located at positions spaced apart from each other by 180 degrees in the circumferential direction, and face each other. The two locking portions 32 of the insertion portion 31 are fitted into the two locking-target portions 15b of the exterior member 15. Thus, the locking portions 32 are locked to the corresponding locking-target portions 15b in the longitudinal direction of the exterior member 15.

Configuration of Fitting Portion 25 (Covering Portion)

The fitting portion 25 is provided at the rear end portion in the insertion direction of the insertion portion 31 (the base end portion in the axial direction of the insertion portion 31). The fitting portion 25 has a circular ring shape that follows the cylindrical shape of the end portion 15a of the exterior member 15. The fitting portion 25 has a recessed portion that is recessed in the axial direction of the case 21. The end portion 15a of the exterior member 15 is fitted to the fitting portion 25. The fitting portion 25 continuously covers the inner circumferential surface that includes the end portion 15a of the exterior member 15 and the end surface of the end portion 15a (the end surface in the longitudinal direction of the exterior member 15).

Specifically, the fitting portion 25 includes an inner wall portion 34 (inner wall), an outer wall portion 35 (outer wall), and a bottom wall portion 36 (bottom wall) that connects the inner wall portion 34 and the outer wall portion 35. The inner wall portion 34 comes into contact with the inner circumferential surface that includes the end portion 15a of the exterior member 15. The inner wall portion 34 constitutes a portion of the insertion portion 31. The outer wall portion 35 comes into contact with the outer circumferential surface that includes the end portion 15a of the exterior member 15. The bottom wall portion 36 connects the base end of the inner wall portion 34 and the base end of the outer wall portion 35. The bottom wall portion 36 comes into contact with the end surface in the axial direction of the end portion 15a. The end portion 15a is fitted between the outer wall portion 35 and the inner wall portion 34 of the fitting portion 25. The fitting portion 25 having the above-mentioned configuration covers the inner circumferential edge portion E at the end portion 15a.

Configuration of Core Housing Portion 24

The core housing portion 24 is a portion for housing the above-described magnetic core 22. Here, as shown in FIG. 4, the cross section of the magnetic core 22 taken in the radial direction has a substantially rectangular shape, for example. The magnetic core 22 includes an outer circumferential surface 51, a first side surface 52 and a second side surface 53, which correspond to the two end surfaces in the axial direction, and an inner circumferential surface 54. The inner circumferential surface 54 of the magnetic core 22 forms the inner surface of the above-mentioned through hole 23. The first side surface 52 and the second side surface 53 of the magnetic core 22 extend substantially in a direction orthogonal to the axis of the case 21.

The magnetic core 22 of this embodiment is arranged on the lateral side in the longitudinal direction with respect to the end portion 15a of the exterior member 15. The first side surface 52 of the magnetic core 22 faces the exterior member 15, and the second side surface 53 is on a side opposite to the first side surface 52. The second side surface 53 of the magnetic core 22 faces the side toward which the electric wires 13 are led out from the electric wire protection member 16.

The central axis of the magnetic core 22 and the central axis of the exterior member 15 are coincident with each other. The inner diameter of the magnetic core 22, that is, the diameter D1 of the through hole 23 (the diameter of the inner circumferential surface 54), is, for example, smaller than the inner diameter D2 of the end portion 15a of the exterior member 15. In other words, the inner circumferential surface 54 of the magnetic core 22 is located on the inside in the radial direction with respect to the outer circumferential surface that includes the end portion 15a of the exterior member 15.

The core housing portion 24 has a circular ring shape and covers the outer circumferential surface of the magnetic core 22, for example. The core housing portion 24 is lined up with the end portion 15a in the longitudinal direction of the exterior member 15. The core housing portion 24 includes, for example, an outer circumferential wall portion 41 that covers the outer circumferential surface 51 of the magnetic core 22, a first side wall portion 42 that covers the first side surface 52 of the magnetic core 22, and a second side wall portion 43 that covers the second side surface 53 of the magnetic core 22. The first side wall portion 42 is adjacent to the bottom wall portion 36 of the fitting portion 25 in the axial direction of the case 21.

The cross section of the core housing portion 24 taken along a cutting plane that includes the central axis has a substantially U-shape that is formed by the outer circumferential wall portion 41, the first side wall portion 42, and the second side wall portion 43 and that is open toward the inner circumference. The magnetic core 22 is arranged inside the core housing portion 24. The outer circumferential wall portion 41 of the core housing portion 24 comes into contact with the outer circumferential surface 51 of the magnetic core 22. The first side wall portion 42 of the core housing portion 24 comes into contact with the first side surface 52 of the magnetic core 22. Also, the second side wall portion 43 of the core housing portion 24 comes into contact with the second side surface 53 of the magnetic core 22. The case 21 of this embodiment does not include a portion to be provided between the inner circumferential surface 54 of the magnetic core 22 and the electric wires 13 inserted through the inside of the inner circumferential surface 54. In other words, the magnetic core 22 is housed in the core housing portion 24 such that the inner circumferential surface 54 of the magnetic core 22 is opposed directly to the electric wires 13.

The second side wall portion 43 of this embodiment is formed at one end portion in the axial direction of the case 21, more specifically at the rear end portion in the insertion direction of the case 21. In other words, the second side wall portion 43 is formed at the end portion of the case 21 on a side on which the electric wires 13 are led out. The diameter of the inner circumferential edge 43a of the second side wall portion 43 is larger than the diameter of the inner circumferential surface 54 of the magnetic core 22. In other words, the inner circumferential surface 54 of the magnetic core 22 is located on the inside in the radial direction with respect to the inner circumferential edge 43a of the second side wall portion 43.

The magnetic core 22 includes a chamfered portion 55 (chamfer) formed by chamfering the corner portion (corner) between the first side surface 52 and the inner circumferential surface 54 into a curved surface. The chamfered portion 55 are formed around the entire circumference of the through hole 23. The chamfered portion 55 is formed around a lead-out opening of the inner circumferential surface 54 (through hole 23) of the magnetic core 22 through which the electric wires 13 are led out.

Configuration of Electromagnetic Shield Member S

As shown in FIG. 4, the wire harness 10 further includes a tubular electromagnetic shield member S. The electromagnetic shield member S is configured to collectively surround all the outer circumferences of the lead-out portions 13a, for example. The electromagnetic shield member S is provided on the substantially entire portions in the longitudinal direction of the lead-out portions 13a. The electromagnetic shield member S covers the outer circumference of the core housing portion 24 housing the magnetic core 22.

The electromagnetic shield member S can be made of a flexible braided wire or metal foil, for example. Examples of the braided wire include a braided wire obtained by braiding a plurality of metal strands, and a braided wire obtained by braiding metal strands and resin strands in combination. A metal material such as a copper-based metal material or an aluminum-based metal material can be used as a material of metal strands, for example. Reinforced fibers such as para-aramid fibers that have excellent insulating properties and excellent shearing resistance can be used as the resin strands, for example. Although not illustrated in the figures, the electromagnetic shield member S is earthed (grounded) via the connector 14 and the like, for example. The electromagnetic shield member S need not be necessarily provided, and can be omitted depending on the configuration of the electric wires 13.

Operations of this embodiment will be described below.

The end portion 15a that includes the edge portion E is covered by the fitting portion 25 formed on the case 21 of the electric wire protection member 16. With this configuration, it is possible to prevent the basal portions of the lead-out portions 13a from coming into contact with the edge portion E at a time when the lead-out portions 13a are handled (e.g., when the connectors 14 provided at the leading end portions of the lead-out portions 13a are connected to a vehicle-mounted apparatus (the high-voltage battery 12 in this embodiment)). Also, it is possible to prevent the basal portions of the lead-out portions 13a from coming into contact with the edge portion E at a time when the vehicle V to which the wire harness 10 is attached vibrates.

In this embodiment, the electric wires 13 may come into contact with the lead-out-side end portion of the inner circumferential surface 54 of the magnetic core 22 through which the electric wires 13 are led out, at a time when the lead-out portions 13a are handled or the vehicle vibrates as mentioned above. To address this, the lead-out-side end portion of the inner circumferential surface 54 of the magnetic core 22 is formed into the chamfered portion 55 having a curved-surface shape, thus making it possible to suppress damage to the electric wires 13 at a time when the electric wires 13 come into contact with the lead-out-side end portion as indicated by dashed double-dotted lines in FIG. 4.

Furthermore, in this embodiment, the inner circumferential edge 43a of the second side wall portion 43 adjacent to the side of the magnetic core 22 from which the electric wires are led out is located on the outer side in the radial direction with respect to the inner circumferential surface 54 of the magnetic core 22. Accordingly, the electric wires 13 are less likely to come into contact with the inner circumferential edge 43a of the second side wall portion 43, at a time when the lead-out portions 13a are handled or the vehicle vibrates as mentioned above.

Effects of this embodiment will be described below.

(1) The case 21 of the electric wire protection member 16 includes the core housing portion 24 that houses the magnetic core 22, and the fitting portion 25 that covers the edge portion E, and these portions are formed in one piece with the case 21. In other words, the fitting portion 25 for preventing the electric wires 13 from coming into contact with the end portion 15a of the exterior member 15, and the core housing portion 24 that houses the magnetic core 22 are formed in one piece with the case 21 of the electric wire protection member 16. Accordingly, there is no need to provide a core case for housing the magnetic core 22 separately from the electric wire protection member 16 having the fitting portion 25. Therefore, although the magnetic core 22 for absorbing an electromagnetic wave emitted from the electric wires 13 is provided, it is possible to suppress an increase in the number of components.

Unlike this embodiment, in a case of a configuration in which the magnetic core 22 is fixed directly to, for example, the lead-out portions 13a of the electric wires 13, the electric wires 13 vibrate in a state in which the weight of the magnetic core 22 is applied to the electric wires 13 when the vehicle vibrates, and thus the electric wires 13 and the connectors 14 may be damaged. However, in this embodiment, the magnetic core 22 is fixed to the exterior member 15 via the case 21, thus making it possible to obtain a configuration in which the weight of the magnetic core 22 is not applied to the electric wires 13. Accordingly, compared with the configuration as mentioned above in which the magnetic core 22 is fixed directly to, for example, the lead-out portions 13a of the electric wires 13, damage to the electric wires 13 and the connectors 14 caused by vibration can be suppressed.

(2) The coupling portion 26 of the case 21 includes the locking portion 32 locked to the locking-target portion 15b of the exterior member 15, and the locking-target portion 15b is a recessed portion to which the locking portion 32 is fitted. With this configuration, it is possible to couple the case 21 to the exterior member 15 through recess-projection fitting between the locking portion 32 of the case 21 and the locking-target portion 15b of the exterior member 15.

(3) The case 21 includes the insertion portion 31 inserted into the inner circumferential side of the exterior member 15. The insertion portion 31 and the core housing portion 24 are provided at positions that do not overlap each other in the radial direction of the case 21. With this configuration, the core housing portion 24 and the magnetic core 22 can be configured to be arranged outside the exterior member 15. Furthermore, since the core housing portion 24 and the magnetic core 22 are arranged outside the exterior member 15, the diameter of the exterior member 15 can be reduced.

(4) The magnetic core 22 is provided with the through hole 23 through which the electric wires 13 are inserted, and the diameter D1 of the through hole 23 is smaller than the inner diameter D2 of the end portion 15a. The magnetic core 22 includes a chamfered portion 55 formed by chamfering the corner portion of the opening in a direction in which the through hole 23 passed therethrough (the axial direction of the case 21) into a curved surface. With this configuration, it is possible to suppress damage to the electric wires 13 caused by contact of the electric wires 13 with the corner portion (chamfered portion 55) that defines the opening of the through hole 23.

(5) The fitting portion 25 serving as the covering portion includes the inner wall portion 34 that comes into contact with the inner circumferential surface that includes the end portion 15a of the exterior member 15, the outer wall portion 35 that comes into contact with the outer circumferential surface that includes the end portion 15a of the exterior member 15, and the bottom wall portion 36 that connects the inner wall portion 34 and the outer wall portion 35. The end portion 15a of the exterior member 15 is fitted between the outer wall portion 35 and the inner wall portion 34 of the fitting portion 25. With this configuration, the end portion 15a of the exterior member 15 is fitted into the fitting portion 25 of the case 21, thus making it possible to couple the electric wire protection member 16 firmly to the end portion 15a of the exterior member 15.

(6) The wire harness 10 includes the connectors 14 that are provided at the end portions in the longitudinal direction of the electric wires 13. The electric wire protection member 16 and the connectors 14 are spaced apart from each other in the longitudinal direction of the electric wires 13. Employing this configuration makes it possible to achieve a configuration in which the case 21 includes the fitting portion 25 and the core housing portion 24 that are formed in one piece with the case 21 while the connectors 14 at the end portions of the electric wires 13 are spaced apart from the exterior member 15.

(7) The case 21 does not include a portion to be provided between the inner circumferential surface 54 of the magnetic core 22 and the electric wires 13 inserted through the inside of the inner circumferential surface 54, and the inner circumferential surface 54 of the magnetic core 22 is opposed directly to the electric wires 13. This enables ensuring the degree of freedom in the design of the inner diameter of the magnetic core 22 (the diameter of the inner circumferential surface 54), thus making it possible to bring the magnetic core 22 closer to the outer circumferences of the electric wires 13.

This embodiment can be implemented with various modifications such as those described below. The present embodiment and the following modified examples can be implemented in combination with each other as long as no technical contradiction arises.

Figure 5:
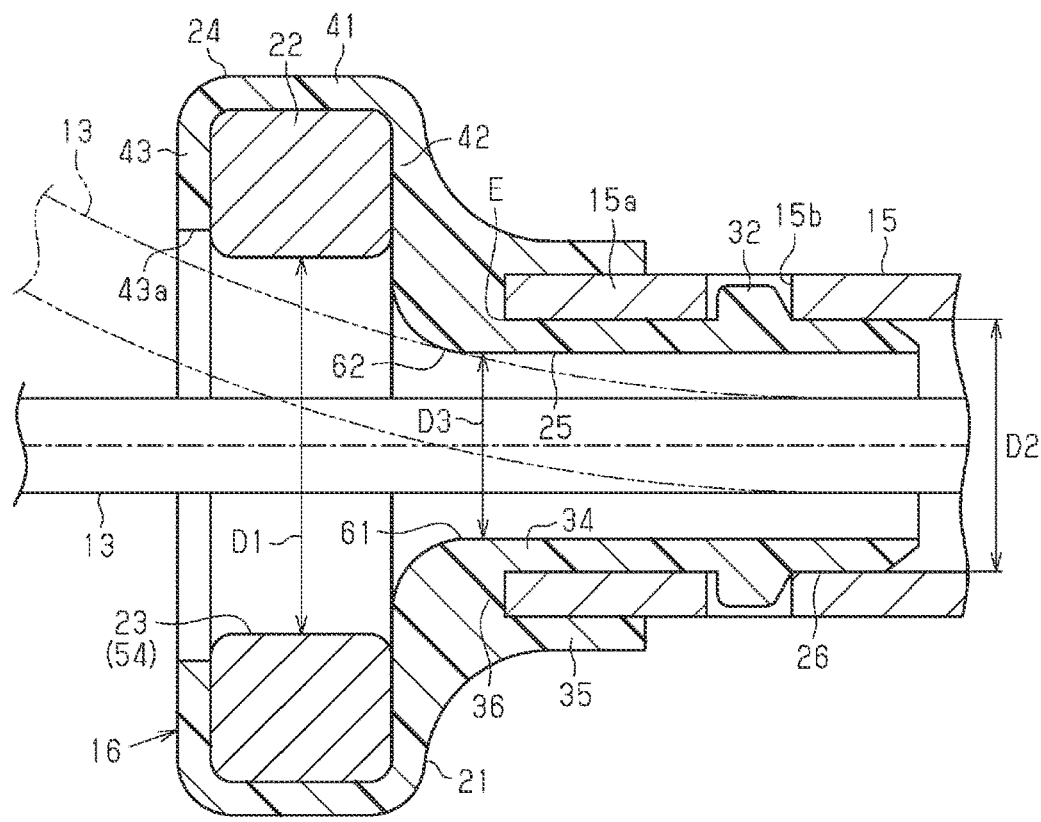
FIG. 5 is a cross-sectional view showing a relevant portion of a wire harness of a first modified example.

For example, as shown in a first modified example in FIG. 5, the diameter D1 of the through hole 23 of the magnetic core 22 may be larger than the inner diameter D2 of the end portion 15a of the exterior member 15. This makes it possible to achieve a configuration in which the electric wires 13 are less likely to come into contact with the magnetic core 22.

The case 21 of the first modified example shown in FIG. 5 is provided with a through hole 61 through which the electric wires 13 are inserted. The through hole 61 has a circular shape as viewed in the axial direction of the case 21. In the first modified example shown in FIG. 5, the through hole 61 is defined by the inner circumferential surface of the inner wall portion 34 of the fitting portion 25. The diameter D3 of the through hole 61 is smaller than the inner diameter D2 of the end portion 15a of the exterior member 15. The case 21 includes a chamfered portion 62 formed by chamfering the corner portion that defines the opening in a direction in which the through hole 61 passed therethrough (the axial direction of the case 21) into a curved surface. The chamfered portion 62 are formed around the entire circumference of the through hole 61. Also, the chamfered portion 62 defines a lead-out opening of the through hole 61 through which the electric wires 13 are led out.

In the first modified example shown in FIG. 5, it is possible to suppress damage to the electric wires 13 caused by contact of the electric wires 13 with the corner portion (chamfered portion 62) that defines the opening of the through hole 61. Since the diameter D1 of the through hole 23 is larger than the inner diameter D2 of the end portion 15a, the electric wires 13 are likely to come into contact with the chamfered portion 62 rather than the magnetic core 22 when moving in the radial direction.

Figure 6:
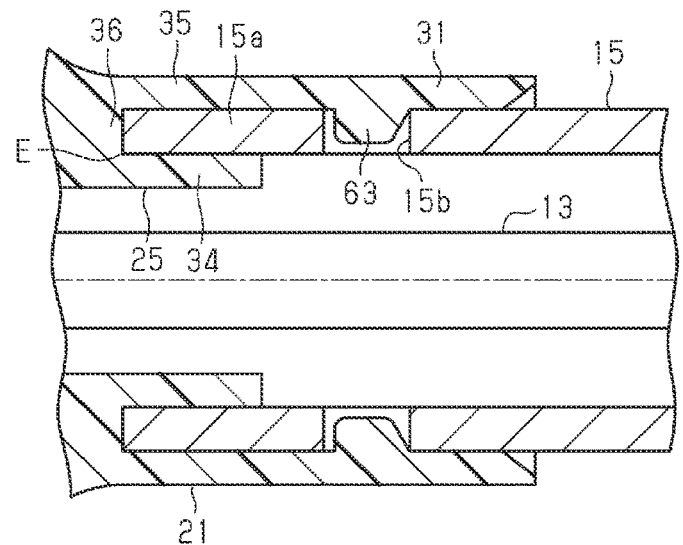
FIG. 6 is a cross-sectional view showing a relevant portion of a wire harness of a second modified example.

For example, as shown in a second modified example in FIG. 6, a configuration may also be employed in which the tubular insertion portion 31 is attached to (fitted around) the outer circumference of the exterior member 15. The case 21 of the second modified example shown in FIG. 6 includes one or more locking portions 63 that protrude inward in the radial direction from the inner circumferential surface of the insertion portion 31. One or more locking portions 63 may be two locking portions 63, for example. The two locking portions 63 are respectively provided on two portions of the insertion portion 31 that are divided by the two slits 33. Also, for example, the two locking portions 63 are located at positions spaced apart from each other by 180 degrees in the circumferential direction, and face each other. The locking portions 63 are fitted into the corresponding hole-shaped locking-target portions 15b of the exterior member 15 from the outer circumferential side. Thus, the locking portions 63 are locked to the corresponding locking-target portions 15b in the longitudinal direction of the exterior member 15.

Although the locking-target portions 15b of the exterior member 15 are in the form of a through hole in the embodiment above and the second modified example shown in FIG. 6, there is no limitation thereto, and they may be in the form of a recessed portion that does not pass through the circumferential wall of the exterior member 15.

Although the locking portions 32 and 63 of the case 21 are in the form of a protrusion and the locking-target portions 15b of the exterior member 15 are in the form of a a recessed portion (hole) in the embodiment above and the second modified example shown in FIG. 6, there is no limitation thereto. That is, the recess-projection relationship between the locking portions 32 and 63 and the locking-target portions 15b may be inverted to obtain a configuration as follows: the locking portions 32 and 63 are in the form of a recessed portion and the locking-target portions 15b are in the form of a protrusion.

The configuration of the magnetic core 22 including the shape and the number is not limited to that of the embodiment above, and can be changed as appropriate.

Figure 7:
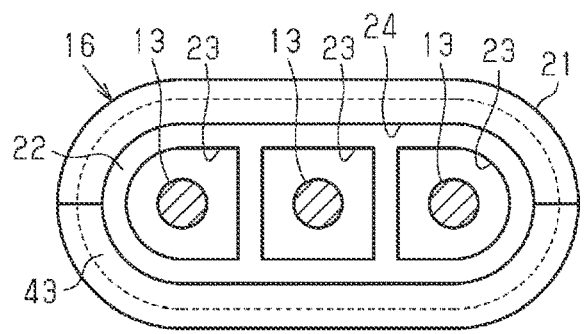
FIG. 7 is a front view showing an electric wire protection member of a third modified example.

For example, as shown in a third modified example in FIG. 7, a configuration may also be employed in which a plurality of through holes 23 is formed in one magnetic core 22, and one or more electric wires 13 are inserted through each of the through holes 23. In the third modified example shown in FIG. 7, three through holes 23 are lined up in a direction orthogonal to the insertion direction of the electric wires 13. One electric wire 13 is inserted through each of the three through holes 23.

Figure 8:
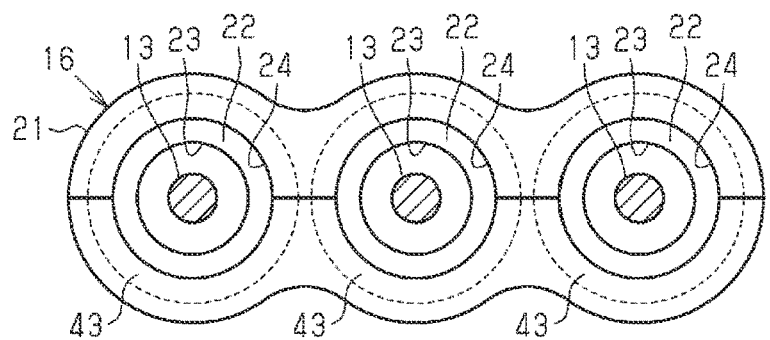
FIG. 8 is a front view showing an electric wire protection member of a fourth modified example.

For example, as shown in a fourth modified example in FIG. 8, the electric wire protection member 16 may have a configuration in which a plurality of magnetic cores 22 are provided in the case 21. The electric wire protection member 16 shown in FIG. 8 includes three magnetic cores 22, each magnetic core 22 being the same as the magnetic core 22 in the embodiment above. The three magnetic cores 22 are lined up in a direction orthogonal to the insertion direction of the electric wires 13. One electric wire 13 is inserted through the through hole 23 of each magnetic core 22.

Figure 9:
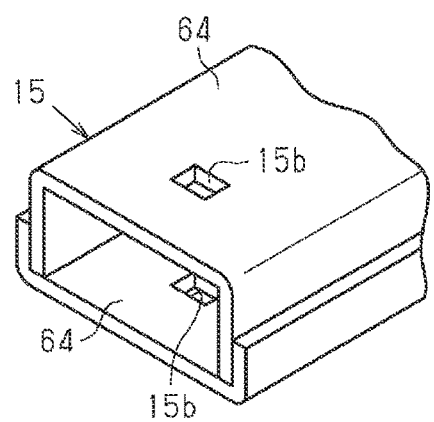
FIG. 9 is a perspective view showing an exterior member of a fifth modified example.

The lateral cross-sectional shape of the exterior member 15 is not limited to a circular shape, and may also be, for example, a substantially tetragonal shape as shown in a fifth modified example in FIG. 9. Also, unlike the embodiment above in which the exterior member 15 is constituted by a single component and has a tubular shape, the exterior member 15 may be constituted by, for example, a combination of a plurality of case segments 64 and have a tubular shape as shown in FIG. 9.

Although the electromagnetic shield member S covers the outer circumference of the core housing portion 24 housing the magnetic core 22 in the embodiment above, there is no particular limitation thereto. For example, as shown in a sixth modified example shown in FIG. 10, a configuration may also be employed in which a tubular electromagnetic shield member S passes on the inner circumference of the magnetic core 22 housed in the core housing portion 24.

Figure 10:
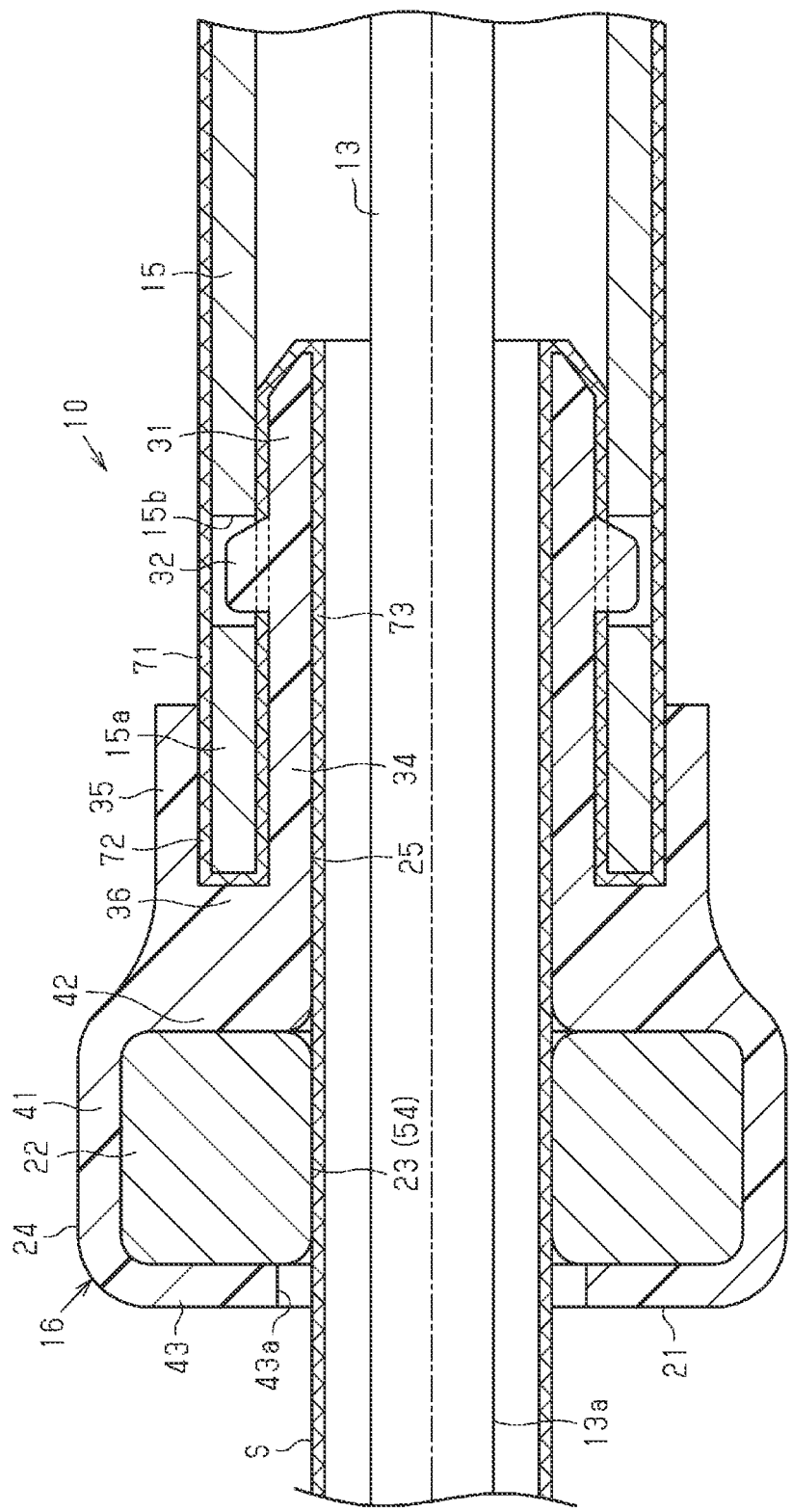
FIG. 10 is a cross-sectional view showing a relevant portion of a wire harness of a sixth modified example.

In the sixth modified example shown in FIG. 10, the electromagnetic shield member S includes an outer circumferential portion 71 that covers the outer circumference of the exterior member 15, an intermediate portion 72 that passes between the case 21 of the electric wire protection member 16 and the exterior member 15, and a shield portion 73 that passes on the inner circumferential side of the insertion portion 31 and the fitting portion 25 of the electric wire protection member 16.

The intermediate portion 72 extends along the inner side surface of the fitting portion 25 and the outer circumferential surface of the insertion portion 31 in the case 21. The intermediate portion 72 is held between the fitting portion 25 of the case 21 and the end portion 15a of the exterior member 15. The intermediate portion 72 is folded back at the leading end portion in the axial direction of the insertion portion 31 and shifted to the shield portion 73.

The shield portion 73 has a tubular shape and extends along the inner circumferential surface of the insertion portion 31. The shield portion 73 passes on the inner circumferential side of the magnetic core 22 and the core housing portion 24. The electric wires 13 are inserted through the inner circumferential side of the shield portion 73. The shield portion 73 covers the substantially entire portions in the longitudinal direction of the lead-out portions 13a of the electric wires 13.

The configuration of the electromagnetic shield member S is not limited to that in the embodiment above and that shown in FIG. 10.

For example, the electromagnetic shield member S may be configured to cover the substantially entire outer circumference of the exterior member 15 in the longitudinal direction of the exterior member 15. This configuration is particularly effective in the case where the exterior member 15 does not have an electromagnetic shielding function due to, for example, the exterior member 15 being made of a synthetic resin.

For example, a configuration may also be employed in which the electromagnetic shield member S is arranged between the electric wires 13 and the exterior member 15, and covers the substantially entire electric wires 13.

For example, a configuration may also be employed in which at least a portion in the longitudinal direction of the electromagnetic shield member S is inserted into the inner circumferential side of the exterior member 15, and the electromagnetic shield member S is fixed to the inner circumferential surface of the exterior member 15 via the inserted portion.

For example, in the configuration in which the electromagnetic shield member S covers the outer circumference of the core housing portion 24 housing the magnetic core 22, the electromagnetic shield member S may be sandwiched between the fitting portion 25 and the end portion 15*a* of the exterior member 15 and be fixed.

For example, a configuration may also be employed in which the electromagnetic shield member S is constituted by two components including a first electromagnetic shield member that mainly covers the exterior member 15 (or portions of the electric wires 13 that are inserted into the exterior member 15) and a second electromagnetic shield member that mainly covers the lead-out portions 13*a* of the electric wires 13. In this case, for example, the first electromagnetic shield member and the second electromagnetic shield member are connected to each other near the fitting portion 25 of the case 21.

Although the magnetic core 22 of the embodiment above is lined up with the end portion 15*a* in the longitudinal direction of the exterior member 15, there is no particular limitation to this configuration, and the magnetic core 22 may be arranged on the outside in the radial direction of the exterior member 15, for example. Also, the magnetic core 22 may be arranged on the inside in the radial direction of the exterior member 15 (i.e., inside the exterior member 15), for example.

In the cases 21 and the magnetic cores 22 of the embodiment above and the modified examples, the corner portions at various positions such as the chamfered portion 55 and the chamfered portion 62 may have a C chamfered shape.

The fitting portion 25 of the case 21 may have a configuration in which the outer wall portion 35 is omitted, or the outer wall portion 35 and the bottom wall portion 36 are omitted.

The case 21 may include a holding portion that comes into contact with the electric wires 13 and holds them. The holding portion is provided at, for example, the inner circumferential edge 43*a* of the second side wall portion 43.

The case 21 may also include an interposing portion that is provided between the inner circumferential surface 54 of the magnetic core 22 and the electric wires 13 inserted through the inside of the circumferential surface 54.

Although the electric wire protection member 16 is spaced apart from the connectors 14 provided at the leading end portions of the lead-out portions 13*a* in the longitudinal direction of the electric wires 13 in the embodiment above, there is no particular limitation to this configuration. For example, a configuration may also be employed in which the electric wire protection member 16 is adjacent to the connectors 14 with very small intervals therebetween. For example, a configuration may also be employed in which the electric wire protection member 16 is adjacent to the connectors 14 and are in contact with them.

The exterior member 15 may be a corrugated tube that is made of a synthetic resin or the like and is flexible.

The present disclosure encompasses the following implementation examples. Reference numerals of constituent elements of the embodiment have been added not to limit the disclosure, but to assist comprehension.

Supplementary Note 1: An electric wire protection member (11) according to an implementation example of the present disclosure includes:
- a case (21) for covering an inner circumferential edge (E) of an exterior member (15) that collectively surrounds one or more electric wires (13); and
- a magnetic core (22) for collectively surrounding the one or more electric wires (13), and
- the case (21) may hold the magnetic core (22).

Supplementary Note 2: In one or more implementation examples of the present disclosure, the case (21) may be attached to the exterior member (15).

Supplementary Note 3: In one or more implementation examples of the present disclosure, the insertion portion (21) may be an engagement portion to be fitted to the inner circumferential side or outer circumferential side of the exterior member (15).

Supplementary Note 4: In one or more implementation examples of the present disclosure, the case (21) may hold the magnetic core (22) at a position that is lined up with the exterior member (15) along the one or more electric wires (13).

Supplementary Note 5: In one or more implementation examples of the present disclosure, the diameter of the outer circumference of the magnetic core (22) may be larger than the diameter of the outer circumference of the exterior member (15).

Supplementary Note 6: In one or more implementation examples of the present disclosure, the case (21) may be internally fitted to the exterior member (15).

Supplementary Note 7: In one or more implementation examples of the present disclosure, the case (21) may be externally fitted to the exterior member (15).

Supplementary Note 8: In one or more implementation examples of the present disclosure, the case (21) may be an assembly of a plurality of divided parts.

Supplementary Note 9: In one or more implementation examples of the present disclosure, the exterior member (15) may be an assembly of a plurality of divided parts.

Supplementary Note 10: A wire harness (10) according to an implementation example of the present disclosure includes:
- an exterior member (15) for collectively surrounding one or more electric wires (13);
- a case (21) that covers an inner circumferential edge (E) of the exterior member (15); and
- a magnetic core (22) for collectively surrounding the one or more electric wires (13), and
- the case (21) may hold the magnetic core (22).

The invention claimed is:

1. An electric wire protection member to be provided at an end in a longitudinal direction of a tube that covers an outer circumference of an electric wire, the electric wire protection member comprising:
   a case; and
   a magnetic core provided to surround the outer circumference of the electric wire, wherein:
      the case includes:
         a core housing that houses the magnetic core; and
         a cover that covers an inner circumferential edge at the end of the tube,
      the core housing and the cover are formed in one piece with the case.

2. The electric wire protection member according to claim 1, wherein:
the case includes a lock to be locked to a locking-target of the tube,
one of the lock and the locking-target is a protrusion, and the other of the lock and the locking-target is a recess to which the protrusion is to be fitted.

3. The electric wire protection member according to claim 1, wherein:
the case includes an insertion to be inserted into an inner circumferential side or an outer circumferential side of the tube, and
the insertion and the core housing are provided at positions that do not overlap each other in a radial direction.

4. The electric wire protection member according to claim 1, wherein:
the magnetic core is provided with a core-side through hole through which the electric wire is to be inserted,
a diameter of the core-side through hole is smaller than an inner diameter of the end of the tube, and
the magnetic core includes a core-side chamfer formed by chamfering a corner that defines an opening of the core-side through hole into a curved surface.

5. The electric wire protection member according to claim 1, wherein:
the case is provided with a case-side through hole through which the electric wire is to be inserted,
a diameter of the case-side through hole is smaller than an inner diameter of the end of the tube, and
the case includes a case-side chamfer formed by chamfering a corner that defines an opening of the case-side through hole into a curved surface.

6. The electric wire protection member according to claim 1, wherein:
the cover is a fitting that includes:
an inner wall configured to come into contact with an inner circumferential surface that includes the end of the tube;
an outer wall configured to come into contact with an outer circumferential surface that includes the end of the tube; and
a bottom wall that connects the inner wall and the outer wall, and
the end of the tube is to be fitted between the outer wall and the inner wall of the fitting.

7. A wire harness comprising:
an electric wire;
a tube that covers an outer circumference of the electric wire; and
an electric wire protection member provided at an end in a longitudinal direction of the tube, wherein:
the electric wire protection member includes:
a case; and
a magnetic core provided to surround the outer circumference of the electric wire, and
the case includes:
a core housing that houses the magnetic core; and
a cover that covers an inner circumferential edge portion at the end of the tube,
the core housing and the cover are formed in one piece with the case.

8. The wire harness according to claim 7, comprising a connector provided at an end in a longitudinal direction of the electric wire,
wherein the electric wire protection member and the connector are spaced apart from each other in the longitudinal direction of the electric wire.

* * * * *